United States Patent Office 3,343,243
Patented Sept. 26, 1967

3,343,243
ADJUSTING ARRANGEMENT FOR MACHINE TOOLS
Hansjörg Renker, Schaffhausen, Switzerland, assignor to Georg Fischer -Aktiengesellschaft, Schaffhausen, Switzerland
Filed Nov. 10, 1965, Ser. No. 507,136
Claims priority, application Switzerland, Nov. 13, 1964, 14,688/64
7 Claims. (Cl. 29—27)

The present invention concerns an adjusting device for machine tools, especially lathes, for adjusting at least two movable units by means of adjusting members which are moved in a predetermined manner by a numerically working control arrangement through the intervention of a control circuit.

In heretofore known control installations of the type involved, it is necessary to equip each movable unit with a separate control circuit. Such control circuit comprises the movable unit, an adjusting unit, a measuring unit, and a comparator. If it is required that the machine tool in this manner numerically control a plurality of movable units, the installation becomes very complicated and expensive because each shaft of the movable units has to be equipped with a special control circuit.

It is, therefore, an object of the present invention to provide an adjusting device for machine tools, which will overcome the above mentioned drawback.

It is another object of this invention to provide an adjusting device of the general type set forth above, which will make it possible for a machine tool with numerical control to control two or more movable units by a single control circuit.

It is a further object of this invention to provide an adjusting device as set forth in the preceding paragraph, which will greatly simplify the same while increasing the reliability of operation thereof.

Still another object of this invention consists in the provision of an adjusting device as set forth above, which will make it possible wth machine tools having a plurality of control circuits to group such control units together.

These and other objects and advantages of the invention will appear more clearly from the following specification in connection with the accompanying drawings, in which:

FIGURE 1 diagrammatically illustrates an adjusting arrangement according to the present invention for a turning machine.

The present invention differs from heretofore known adjusting arrangements primarily in that means are provided for selectively drivingly connecting at least two adjusting members either with a control circuit or with a return motor independent thereof, which latter returns the respective movable unit to a synchronizing zero point of the numerical control. According to a particularly advantageous embodiment of the present invention, spindles are employed as adjusting members, and the connection between adjusting members and servomember or return motor is effected by clutches and gears.

Figure 1:
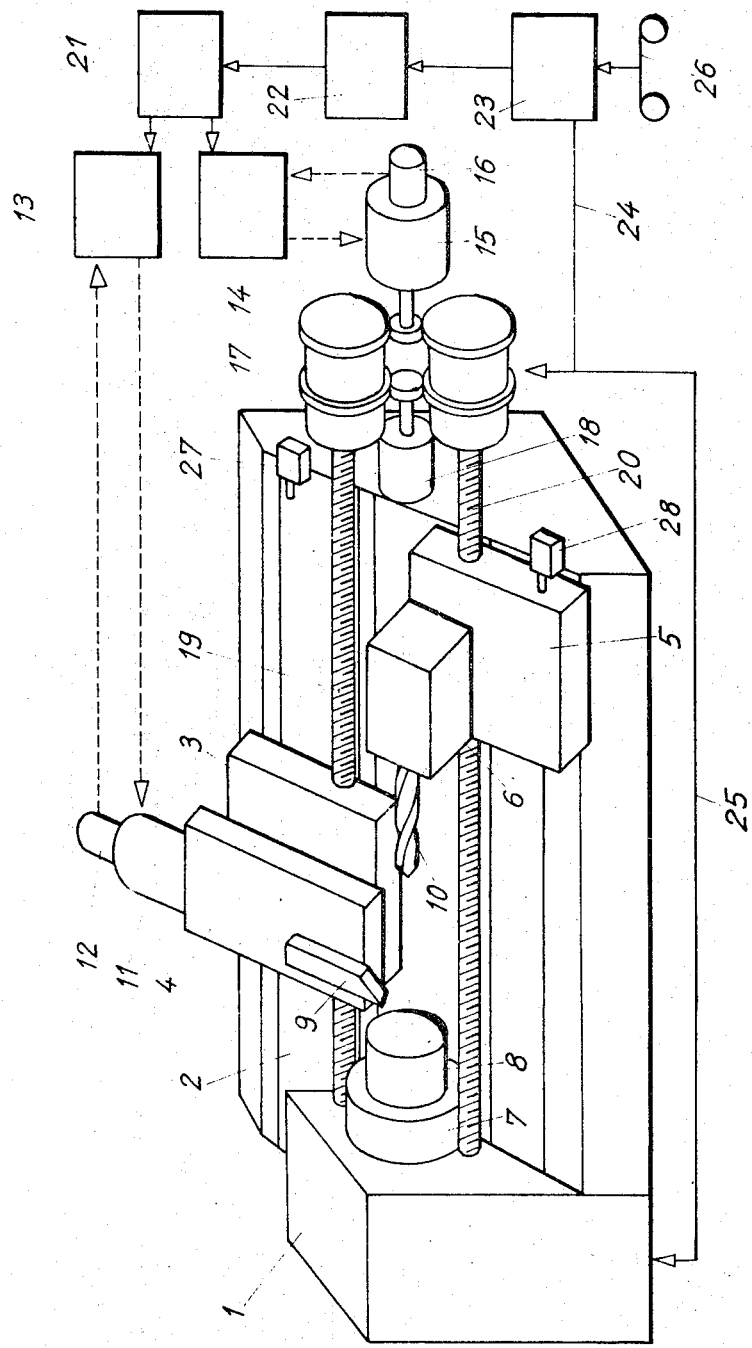

Referring now to the drawings in detail, FIG. 1 shows the main members of a turning machine, namely a head stock 1 which is connected to a machine bed 2, a longitudinal carriage 3, a transverse carriage 4 movable on longitudinal carriage 3, and a second longitudinal carriage 5 as well as a boring unit 6 connected to said second carriage. The arrangement shown in FIG. 1 furthermore comprises a follower 7 of any standard design. The reference numeral 8 designates a work piece which is to be machined by a cutting tool 9 and drill 10. Transverse carriage 4 is adapted to be moved through the intervention of a control circuit which includes an adjusting motor, i.e. adjusting member 11, measuring member 12 and comparator 13. The first control circuit serves for transverse adjustment of the movable unit which consists of transverse carriage 4 and cutting tool 9.

A further control circuit is provided for the movement of longitudinal carriages 3 and 5. This second control circuit comprises a comparator 14, an adjusting motor 15, a measuring member 16 and the intermediate transmission 17 as well as a return motor 18 and the two adjusting spindles 19 and 20.

The two control circuits receive their rated values from the control device 21 which is fed by the interpolator 22. Interpolator 22 receives the shaping signals from decoder 23 which at the same time also emits the control information through lines 24 and 25 to the intermediate transmission 17 and the other control members of the turning machine. A perforated strip 26 furnishes in a manner known per se the control signals as well as the shaping signals to the decoder 23. For purposes of moving the longitudinal carriage 3 to the synchronizing zero point of the numerical control, there is provided a limit switch 27. In an analogous manner, there is provided a limit switch 28 for moving longitudinal carriage 5 into its synchronizing zero point.

Figures 2, 2A:
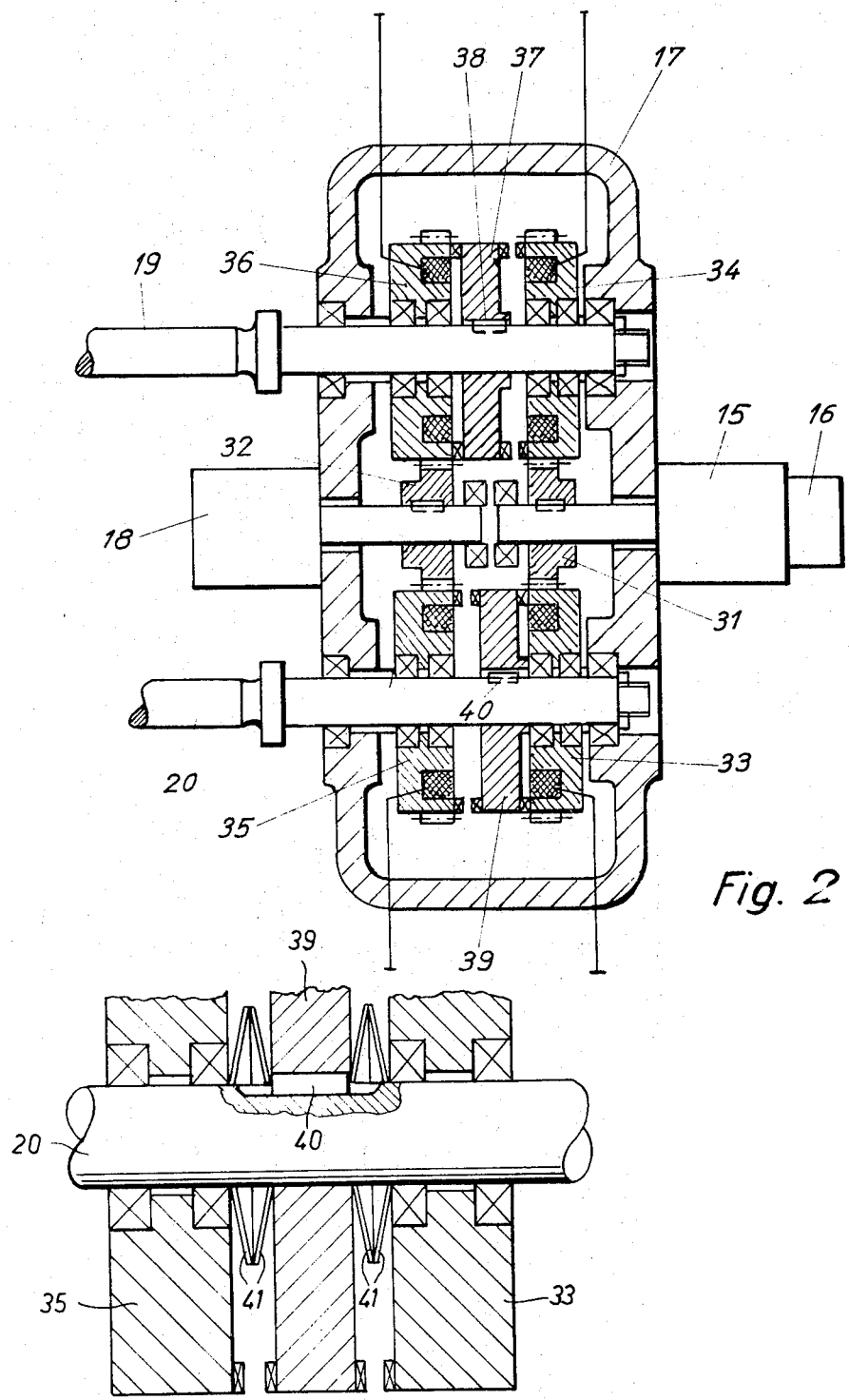
FIGURE 2 is a section through the intermediate transmission adapted selectively drivingly to interconnect two adjusting members with the adjusting element and the measuring member of the control circuit and with the return motor.
FIGURE 2a shows in more detail a clutch of the intermediate transmission of FIG. 2 in neutral position and drawn to an enlarged scale.

The intermediate transmission 17 is shown in FIG. 2 on a larger scale than in FIG. 1. FIG. 2 also shows the adjusting motor 15 and the measuring member 16. At the opposite side there are furthermore shown the return motor 18 and the adjusting spindles 19 and 20. The intermediate transmission 17 comprises a driving gear 31 pertaining to the adjusting motor 15 and a driving gear 32 pertaining to the return motor 18. Gear 31 is adapted to act upon the clutch sections 33 and 34. Clutch section 33 is freely rotatably journalled on adjusting spindle 20. Clutch section 34 is freely rotatably journalled on adjusting spindle 19. Driving gear 32 acts upon clutch sections 35 and 36. Clutch section 35 is freely rotatably journalled on adjusting spindle 20. Clutch section 36 is freely rotatably journalled on adjusting spindle 19. Clutch member 37 is arranged between clutch sections 34 and 36 and is axially adjustable while being drivingly connected to adjusitng spindle 19 by means of a key 38. in an analogous manner, clutch member 39 is axially displaceable on adjusting spindle 20 and is drivingly connected thereto by means of a key 40. Intermediate clutch members 37 and 39 and their associated clutch sections 34, 36 and 33, 35, respectively, pairs of belleville-type springs 41 (FIG. 2a) are seated on shafts 19 and 20 so as to maintain clutch members 37 and 39 in the neutral position. At the same time the springs 41 serve to return the clutch members 37 and 39 to the neutral position when the coils of the electromagnetic clutch sections 35 and 36 or 33 and 34 are deenergized.

The operation of the arrangement illustrated in FIGS. 1 and 2 is as follows. If it is desired to machine a work piece 8 by means of tool 9 in conformity with numerical shaping signals emitted by control circuit 14, 15, 16 and control circuit 11, 12, 13, clutch section 34 is connected to clutch member 37. Thus, driving connection is established between adjusting motor 15 and adjusting spindle 19. At the same time, clutch sections 33 and 35 are separated from clutch member 39. Longitudinal carriage 5 will at this time be at its synchronizing zero point.

When tool 9 has completed its work, it will receive an impulse from control circuit 11, 12, 13 for returning. At the same time, clutch member 37 will be disengaged from clutch section 34 and will be moved to clutch section 36. In this way driving connection is established between adjusting spindle 19 and return motor 18 which latter pulls back longitudinal carriage 3 until limit switch 27 indicates that the synchronizing zero point has been reached. By means of limit switch 27, clutch member 37 is disengaged from clutch section 36 and returned to its neutral position by the corresponding spring pair 41. Shortly after tool 9 has moved away from work piece 8, clutch member 39 will be moved to clutch section 33. Adjusting motor 15 is then able through the intervention of driving gear 31 and clutch section 33 to drive adjusting spindle 20 so that longitudinal carriage 5 will carry out its working operation in conformity with the numerically emitted signals. In the present instance, this working operation comprises a drilling operation by means of drill 10 to a predetermined depth. The return of drill 10 and the return of longitudinal carriage 5 to the synchronizing zero point on limit switch 28 will be effected in an analogous manner. By providing two clutches on each adjusting spindle while one clutch is arranged between the adjusting spindle and the servo return of the control circuit and the second clutch is arranged between the adjusting spindle and the adjusting motor independent of said control unit, it is possible by extremely simple mechanical means to combine two control circuits.

By employing tooth clutches, it is possible to reduce to a minimum the play in the transmission from the adjusting motor to the adjusting spindle. For purposes of increasing the precision at which the movable units—in the above described example formed by longitudinal carriages—at the synchronizing zero point of the numerical control are stopped, it is possible in addition to the limit switches acting upon the clutches also to arrange adjustable fixed abutments.

A particularly advantageous embodiment of an adjusting arrangement according to the present invention can be realized by equalizing the masses as well as the driving inertia moments of each of at least two movable units reduced to the entry of the control circuit, whereas the total of the frictional and cutting resistances are made approximately equal with regard to the entry of the control circuit.

The present invention makes it possible to simplify a machine tool with numerical control by the fact that two or more movable units can be controlled by a single control circuit. This in turn brings about a reduction in cost of the control unit of the machine tool. On the other hand, the safety of operation will be increased by the simplification of the control unit. Particularly with machine tools having a plurality of control circuits, it is possible by the present invention, to combine control circuits to groups.

It is, of course, to be understood that the present invention is, by no means, limited to the particular arrangement shown in the drawings but also comprises any modifications within the scope of the appended claims.

What is claimed is:

1. In a machine tool; at least two moveable tool carrying units, a drive motor for advancing said units in working direction, numerical control means connected to said drive motor in controlling relation thereto, a return motor separate from said drive motor and operable independently of said control means for returning said units from an advanced position into which they have been moved by said drive motor to a predetermined starting or zero position, and means for selectively connecting said units first to said drive motor and then to said return motor.

2. A machine tool according to claim 1 in which the masses and inertia moments of each of said units as well as the cutting and frictional resistances thereof, all as referenced to the input to said drive motor are substantially equal.

3. A machine tool according to claim 1 in which each unit has a rotatable drive spindle, a first clutch part on each spindle, a second and a third clutch part for each first clutch part, said drive motor being drivingly connected to said second clutch parts and said return motor being drivingly connected to said third clutch parts, and means for effecting selective engagement of said first clutch parts with one or the other of the said second and third clutch parts pertaining thereto.

4. A machine tool according to claim 1 which includes means for stopping said units in their said starting or zero positions when moved thereto by said return motor.

5. A machine tool according to claim 3 which includes means for stopping said units in their said starting or zero positions when moved thereto by said return motor.

6. A machine tool according to claim 3 in which each said first clutch part has a neutral position wherein it is disengaged from both of said second and third clutch parts pertaining thereto, and electrically operable means under the control of said control means for effecting shifting of each said first clutch part into engagement with one or the other of the said second and third clutch parts pertaining thereto.

7. A machine tool according to claim 5 in which said clutch parts are toothed for effecting slip-free engagement with each other.

No references cited.

RICHARD H. EANES, Jr., *Primary Examiner.*